United States Patent Office 3,365,970
Patented Jan. 30, 1968

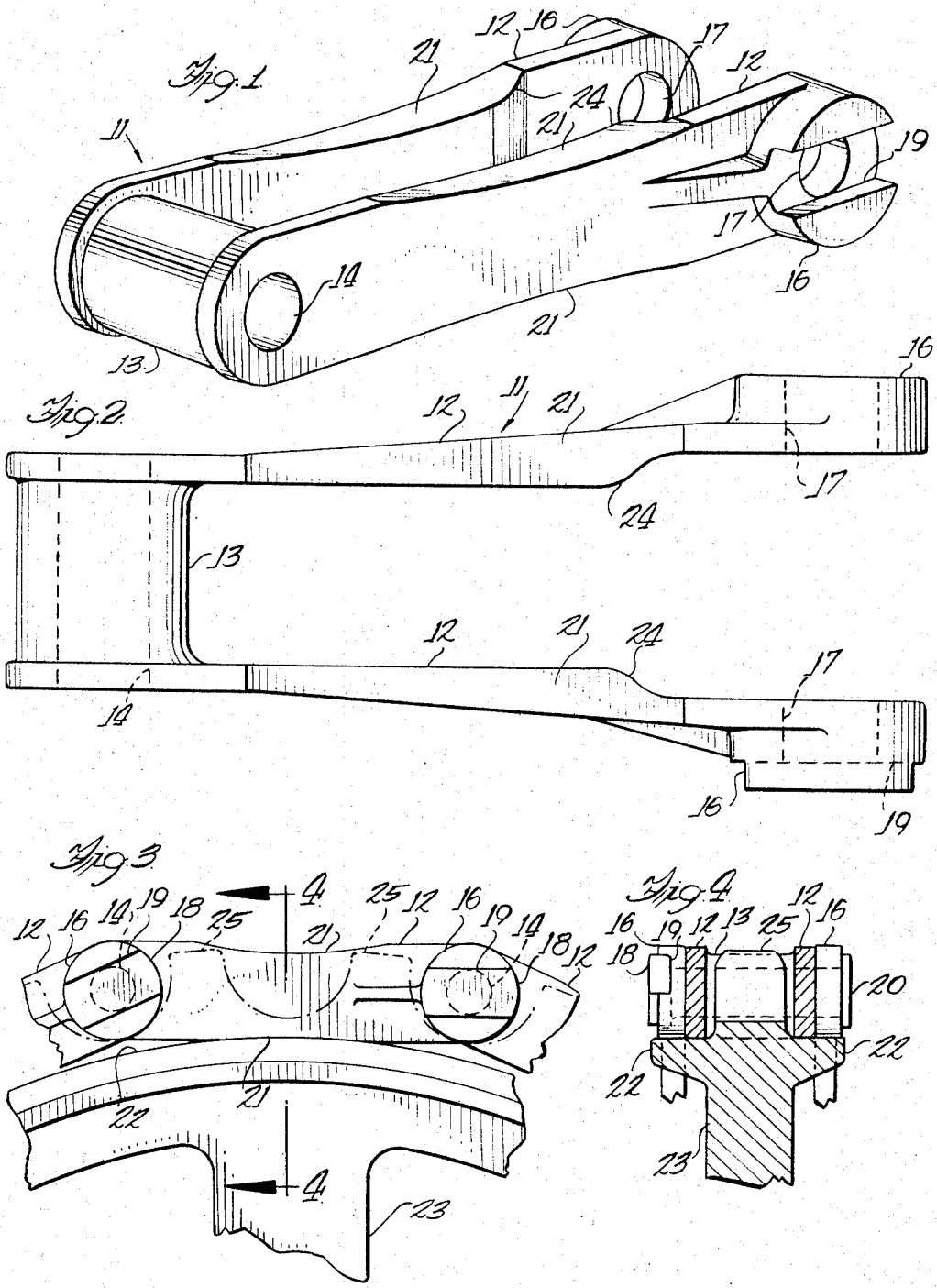

3,365,970
CHAIN
Hubert Steorts, Jr., Indianapolis, Ind., assignor to Link-Belt Company, a corporation of Illinois
Filed Oct. 4, 1965, Ser. No. 492,533
3 Claims. (Cl. 74—249)

ABSTRACT OF THE DISCLOSURE

A chain employing a series of articulated links having concave load bearing surfaces formed in the top and bottom edges along longitudinally tapered portions of each side bar of each link for use with a toothed sprocket having an annular rim projecting on each side thereof, the annular rims and load bearing surfaces being of the same radius of curvature so that when the chain is trained over the sprocket there is surface contact between the peripheral surfaces of the annular rims and the adjacent load bearing surfaces of the chain links.

---

This invention relates generally to link chain and more particularly to chain links having longitudinally extending side bars with a pair of concave load bearing surfaces on the edges of each side bar shaped to engage with the annular rims on a sprocket wheel.

During the operation of a chain over a sprocket wheel the forces acting on the chain are normally distributed to those chain joints contacting the sprocket teeth. The outer member of the joint is seated between and driven by the sprocket teeth frequently causing excessive wear on the surfaces of the outer joint members and teeth. When the sprocket wheel is provided with annular rims which contact the bottom edge of each of the side bars on a chain link, a portion of the forces acting on the chain are then distributed to the load bearing surface located at the tangential line of contact between the edge of each side bar and the associated annular rim on the sprocket wheel. This distribution of the forces acting on the chain link reduces the wear on the outer joint members and teeth, but causes wear on the edges of the side bars of the chain link resulting in a shortening of the useful life of the chain.

In cast link chains efforts have been made in the past to increase the load bearing surfaces of the chain link side bars. These efforts have included the forming of concave load bearing surfaces on the edges of the side bars to engage annular rims provided on the sprocket wheel. They have also included the adding of laterally extending flanges to the concave load bearing surfaces on the side bars in order to increase the contact area of these bearing surfaces.

For the chain links to be cast with both flanges extending laterally outwardly from the same side of each side bar, it is necessary to use cores that are inserted into the mold to fill the space between the flanges. This is not deemed to be practical due to the difficulties encountered in the forming of the mold along with increased manufacturing costs and production time. It is therefore necessary that the flanges be cast on opposite sides of each side bar and extend laterally outwardly from opposite edges thereof.

It is therefore a primary object of this invention to provide a chain link having longitudinally tapered side bars and longitudinally extending concave load bearing surfaces to provide greatly increased load bearing surface areas without substantially increasing the weight of the chain link.

Another object of this invention is to provide a chain link having a pair of concave load bearing surfaces on the opposite edges of each longitudinally tapered side bar to engage annular rims on a sprocket wheel, thereby allowing the chain to be inverted when wear occurs at the edges in contact with the annular rims without changing the locations on the rims that are engaged by the bearing surfaces.

Other objects and advantages of this invention will be apparent during the course of the following description.

In the accompanying drawings forming a part of this specification, and in which like reference characters are employed to designate like parts throughout the same:

FIGURE 1 is a perspective view of a chain link embodying the invention.

FIGURE 2 is a top plan view of the chain link shown in FIG. 1.

FIGURE 3 is a fragmentary side elevational view showing the chain link of FIG. 1 as a member of a linked chain trained over a sprocket wheel.

FIGURE 4 is a fragmentary sectional view taken on line 4—4 of FIG. 3.

In the drawings, wherein for the purpose of illustration is shown a preferred embodiment of this invention, and first particularly referring to FIGS. 1 and 2, there is illustrated a chain link 11 having laterally spaced side bars 12 longitudinally extending from the integral barrel 13. The barrel 13 has an aperture 14 bored axially therethrough to provide the pitch hole at one end of the link, and bosses 16 extend laterally from the outer surface of the side bars 12 at the opposite end of the link and have axially aligned cylindrical apertures 17 bored therethrough to provide the pitch holes at the other end of the link.

The side bars 12 are of an offset construction allowing the barrel end of an associated chain link 11 to be inserted between the side bars 12 with its aperture 14 aligned with the apertures 17 in the bosses 16. The associated chain links 11 are connected for articulation by the insertion of pin 15 through the axially aligned apertures 14 and 17.

The pin 15 (see FIG. 4) has a T-shaped head 18 which is prevented from turning by close fitting slot 19 in one of the bosses 16. After the pin 15 is inserted through the bosses 16 on one chain link and the barrel 13 of its associated chain link, the end of the pin is then formed into a circular head 20 to tightly abut against the adjacent boss 16.

The side bars 12 are formed with longitudinally extending concave load bearing surfaces 21 in their top and bottom edges. These concave surfaces are shaped to engage the curvature of the annular rims 22 on the sprocket wheel 23. Each of the side bars 12 are longitudinally tapered so that the widths of the concave surfaces 21 vary from a maximum value at the shoulders 24. The increase in the width of certain portions of the bearing surfaces 21 provides a dimensionally increased contact area with the annular rims 22 of the sprocket wheel 23 that is comparable to that provided by flanged side bars and with no material difference in weight but permits the use of a simple mold without cores and does not limit the degree of permissible wear to a particular flange thickness.

Referring to FIG. 3, the associated chain links 11 are interconnected by pins 15 to form a chain. This chain is trained over the sprocket wheel 23 having sprocket teeth 25 projecting radially outwardly around its periphery. These sprocket teeth 25 project into the spaces formed between the side bars 12 and barrel 13 of one chain link and the barrel of its associated chain link which is secured between the bosses 16 of the first chain link. The bottom concave bearing surface 21 on each of the side bars 12 is formed to engage with its adjacent annular rim 22 on the sprocket wheel 23. This arrangement distributes the load on the chain along the bottom load bearing concave surfaces 21 to the annular rims 22 of the sprocket wheel 23. The chain is driven by the sprocket teeth 25 successively abutting against the barrels 13 of the interconnected chain links 11 as the sprocket wheel 23 is rotated.

Since the side bars 12 are longitudinally tapered to increase the widths of portions of the concave surfaces 21, the forces on the chain are distributed over a greater area on the annular rims 22 to reduce the bearing pressure between the side bars and the annular rims. This greater distribution of the forces acting on the chain materially reduces the wear on the chain links thereby increasing their useful life.

Because each of the side bars 12 has a concave load bearing surface 21 formed in both its top and bottom edges, the chain may be inverted so as to use the top concave surfaces upon the excessive wearing of the bottom concave surfaces which are initially in contact with the annular rims 22.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A chain for use with a toothed sprocket having an annular rim transversely projecting outwardly from each side thereof radially inwardly of and adjacent to the toothed periphery of the sprocket, said chain comprising:
   a series of chain links each having laterally spaced longitudinally extending side bars with an integral member extending therebetween and connecting the side bars at one end of each link, said series of links having the connected ends of the side bars positioned between the spaced free ends of the side bars of an adjacent link, adjacent links being rotatably connected by a pin extending laterally through the spaced free ends of the side bars and the interpositioned connected ends of the side bars of the adjacent link so as to connect the links into a chain or articulated links;
   the side bars of each link having an integrally formed longitudinally tapered portion extending the depth of each side bar between the longitudinal edges of each side bar, said tapered portion on each side bar having its maximum thickness adjacent the free end of the side bar;
   a load bearing surface formed on opposite edges of each longitudinally tapered portion of each side bar; and
   the load bearing surfaces of the side bars of each link being identically shaped and arcuately formed to engage with the peripheral surfaces of the annular rims on the sprocket when the chain is trained therearound.

2. The chain described in claim 1 further characterized by the inner surfaces of the tapered portions of the side bars of each chain link being substantially parallel with such surfaces being normal to a plane passing through the axis of the pin connecting adjacent links.

3. A chain for use with a toothed sprocket having an annular rim transversely projecting outwardly from each side thereof, the chain having articulated links connected in end-to-end relationship with each of the links comprising:
   a pair of laterally spaced longitudinally extending identical side bars with a member cast integrally therebetween to connect the side bars at one end of the link;
   the side bars being cast to provide identically shaped load bearing surfaces extending longitudinally along the opposite edges of each side bar;
   the load bearing surfaces on each side bar being formed on the opposite edges of a longitudinally tapered portion of each side bar located intermediate the ends of such bar, each tapered portion having its maximum thickness adjacent the free end of the side bar and each tapered portion extending the depth of each side bar;
   the load bearing surfaces being concave to mate with the radius of curvature of the associated annular rims on the sprocket for surface-to-surface contact between the load bearing surfaces and the adjacent peripheral surfaces of the annular rims when the chain is trained around the sprocket; and
   the load bearing surfaces on the opposite edges of the side bars engaging the same portions of the peripheral surfaces of the annular rims when the chain is inverted to place the opposite edge thereof adjacent the annular rims.

References Cited
UNITED STATES PATENTS

| | | | |
|---|---|---|---|
| 658,017 | 9/1900 | Levalley | 74—255 |
| 1,529,243 | 3/1925 | Drake et al. | 74—245 |
| 1,587,054 | 6/1926 | Weiss | 74—245 |
| 1,881,631 | 10/1932 | Jewett | 74—251 X |
| 2,625,830 | 1/1953 | Transeau | 74—255 |
| 2,869,380 | 1/1959 | Lemmon | 74—245 |

MILTON KAUFMAN, *Primary Examiner.*

FRED C. MATTERN, *Examiner.*

J. A. WONG, *Assistant Examiner.*